United States Patent
Hu et al.

(10) Patent No.: US 9,614,978 B2
(45) Date of Patent: Apr. 4, 2017

(54) ROAMING SUPPORT FOR SOFTWARE DEFINED NETWORKING ARCHITECTURE IN MOBILE NETWORK

(71) Applicant: AT&T Intellectual Property I, L.P., Atlanta, GA (US)

(72) Inventors: Qingmin Hu, Sammamish, WA (US); Farooq Bari, Kirkland, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 60 days.

(21) Appl. No.: 14/530,507

(22) Filed: Oct. 31, 2014

(65) Prior Publication Data

US 2016/0127886 A1    May 5, 2016

(51) Int. Cl.
| | | |
|---|---|---|
| *H04M 15/00* | (2006.01) | |
| *H04W 8/12* | (2009.01) | |
| *H04W 8/08* | (2009.01) | |

(52) U.S. Cl.
CPC ............ *H04M 15/66* (2013.01); *H04W 8/12* (2013.01); *H04W 8/082* (2013.01)

(58) Field of Classification Search
CPC ............ H04W 8/183; H04W 28/0215; H04W 84/042; H04M 15/66
See application file for complete search history.

(56) References Cited

U.S. PATENT DOCUMENTS

| | | | | |
|---|---|---|---|---|
| 8,923,853 B1* | 12/2014 | Shaw | ...................... | H04W 8/12 455/432.1 |
| 2003/0176188 A1* | 9/2003 | O'Neill | ................... | H04L 63/08 455/433 |
| 2010/0105368 A1* | 4/2010 | Nakai | ................. | H04L 12/1421 455/414.1 |
| 2013/0329601 A1* | 12/2013 | Yin | ......................... | H04L 45/02 370/254 |
| 2015/0105049 A1* | 4/2015 | Golaup | ............... | H04L 63/0892 455/411 |
| 2015/0172993 A1* | 6/2015 | Jiang | ..................... | H04W 40/20 455/406 |
| 2015/0257043 A1* | 9/2015 | Wallis | ............... | H04W 36/0022 455/436 |

* cited by examiner

*Primary Examiner* — Daniel Washburn
*Assistant Examiner* — Eboni Hughes
(74) *Attorney, Agent, or Firm* — Amin, Turocy & Watson, LLP

(57) ABSTRACT

A software defined networking controller can be provided to manage sharing of information relating to roaming requests for mobile devices that are roaming on visited networks. The software defined networking controller can be a sub-instance of a main software defined networking controller that manages traffic within the home network, and the software defined networking controller can sit at the edge of the home network and control edge routing elements. The edge software defined networking controller may communicate with roaming partner's edge software defined networking controller and/or with the roaming interconnect operator's software defined networking controller to exchange roaming related information.

20 Claims, 10 Drawing Sheets

ROAMING SUPPORT FOR SOFTWARE DEFINED NETWORKING ARCHITECTURE IN MOBILE NETWORK

TECHNICAL FIELD

The subject disclosure relates to roaming support on a software defined networking architecture mobile network.

BACKGROUND

Widespread proliferation of wireless broadband networks offers increased quality of experience for mobile users, but also renders management and maintenance of these networks a tedious and costly task. The network core, which facilitates mobile management and data transfer is traditionally comprised of individual server elements with each piece of hardware performing a dedicated task. Several of the server elements perform control plane functions of managing subscription information, traffic management and data routing. This routing can be especially complicated with roaming operations as information needs to be exchanged seamlessly between multiple operator domains. Additionally, once a roaming connection has been established, service sensitive routing may need to be established for end to end traffic.

As mobile device users travel, provision of mobile services across different operator domains will be provided. In order to support roaming services, mobile networks will need to exchange information with each other about subscription information related to the mobile device users.

DETAILED DESCRIPTION

Figure 1:
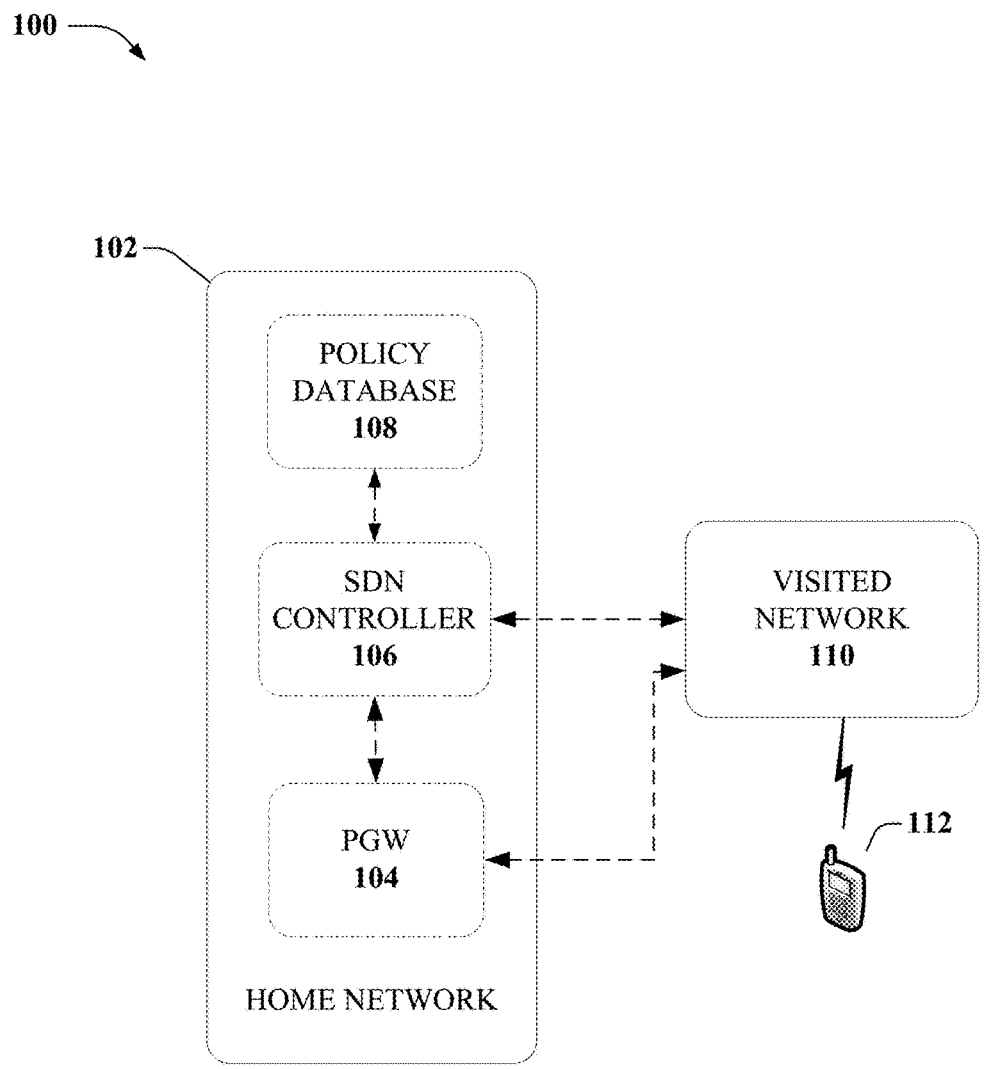
FIG. 1 is an example, non-limiting embodiment of a block diagram showing a software defined networking architecture that provides roaming support in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A network core with a software defined networking ("SDN") controller is provided to control routing of traffic within the network and between the network and the traffic destination. The SDN controller is merged with existing $3^{rd}$ Generation Partnership Project ("3GPP") network architecture to enable service deliveries via open application programming interfaces ("APIs") and move the network core towards an all internet protocol ("IP"), cloud based, and software driven telecom network. The SDN controller can work with, or take the place of policy and charging rules function ("PCRF") network elements so that policies such as quality of service and traffic management and routing can be synchronized and managed end to end.

An SDN controller can be provided to manage sharing of information relating to roaming requests for mobile devices that are roaming on visited networks. The SDN controller can be a sub-instance of a main SDN controller that manages traffic within the home network, and the SDN controller can sit at the edge of the home network and control edge routing elements. The edge SDN controller may communicate with roaming partner's edge SDN controller and/or with the roaming interconnect operator's SDN controller to exchange roaming related information. This exchange mechanism will provides a consistent user experience while roaming and will provide operators flexibility in providing service chaining based on services, applications, network conditions, subscriber preferences, etc.

In an embodiment, the SDN controller on a home network can receive service profile requests from legacy PCRF network elements on a roaming network. The service profile request protocols from the PCRF may differ from a SDN protocol, and the SDN controller can translate the non-compatible protocol to match the SDN protocol. In other embodiments, the SDN controller can enable 'local breakout' which enables the roaming mobile device to use a packet data network gateway ("PGW") on the roaming network while roaming. This allows the mobile device to experience home-style services while roaming.

For these considerations as well as other considerations, in one or more embodiments, a software defined networking controller includes a processor and a memory that stores executable instructions that when executed by the processor, facilitate performance of operations, including receiving a service profile request from another software defined networking controller of a visited mobile network, wherein the service profile request is associated with a mobile device that is roaming on the visited mobile network. The operations can also include retrieving service profile information from a policy data store of a home mobile network of the mobile device. The operations can further include initiating transmission of the service profile information about the mobile device to the other software defined networking controller.

In an embodiment, a method can comprise receiving, by a first software defined networking controller comprising a processor, a service profile request from a second software defined networking controller of a visited mobile network, wherein the service profile request is associated with a mobile device that is determined to be roaming on the visited mobile network. The method can also comprise collecting, by the first software defined networking controller, service profile information associated with the mobile device from a policy data store of a home mobile network for the mobile device. The method can also include sending, by the first software defined networking controller, the service profile information to the second software defined networking controller of the visited mobile network.

In another embodiment, a computer-readable storage device having instructions stored thereon that, in response to execution, cause a software defined networking controller comprising a processor to perform operations including receiving a service profile request of a mobile device from another second software defined networking controller of a roaming network on which the mobile device is roaming. The operations can also include collecting service profile information from a policy data store of a home network of the mobile device. The operations can further include sending the service profile information about the mobile device to the second software defined networking controller of the roaming network.

Turning now to FIG. 1, illustrated is an exemplary a block diagram showing a software defined networking architecture 100 that provides roaming support in accordance with various aspects described herein. A home network 102 can be a mobility core network and can contain core network elements in the user plane and control plane that enable mobile devices on the network to transfer data to and from an external packet network.

One such element in the home network 102 is a packet data network gateway ("PGW") 104. POW 104 can receive packets or other data transmissions from one or more Evolved Node Bs that are the hardware that is communicably coupled to the mobile phone network that communicates directly with mobile devices. The PGW 104 can receive packets from the eNodeB via a serving gateway ("SGW") (not shown) that is provided to route and forward data packets received from the mobile devices while PGW 104 is provided to facilitate connectivity between the mobile devices and the external packet data networks.

In an embodiment, a PGW 104 can provide services for a mobile device 112, even when the mobile device 112 is connected to a visited network 110. The visited network 110 can be a roaming network where the mobile device 112 is able to connect but the visited network 110 may not be a native network for the mobile device 112.

The SDN controller 106 can provide traffic management control for packets received from the mobile device via visited network 110 at the PGW 104, and can also provide traffic management for packets forwarded back to the mobile device 112 from an external packet network. The SDN controller 106 can apply rules and policies based on user related information and subscription material available in a policy database 108.

In an embodiment, when mobile device 112 first accesses visited network 110, visited network 110 can determine which network mobile device 112 belongs on (i.e., home network 102). Visited network 110 will then send a service profile request to the home network 102 requesting service profile information such as subscription level, subscription service types, QoS levels for various applications such as voice and video, related network parameters, and service specific routing information such as lawful intercept. An SDN controller 106 that is specifically configured to be logically located on the edge of the home network 102 can intercept these service profile requests and retrieve the relevant service profile information from policy database 108 on home network 102. SDN controller 106 can identify the relevant service profile information using mobile device identifiers in the service profile request, such as the international mobile subscriber identity ("IMSI"), or the mobile subscriber ISDN number ("MSISDN").

Once the service profile information is retrieved from the policy database 108, the service profile information can be transmitted by the SDN controller 106 to the visited network 110. The service profile information can then be used by visited network 110 in facilitating the connection of the mobile device 112 the visited network. In an embodiment, PGW 104 can receive data sent from the mobile device 112 to the visited network 110, and then provide the routing and data connection to an external packet network (e.g., Internet). In other embodiments, using local breakout, user plane functionality for the mobile device 112 can be provided by a PGW located at the visited network 110.

Figure 2:
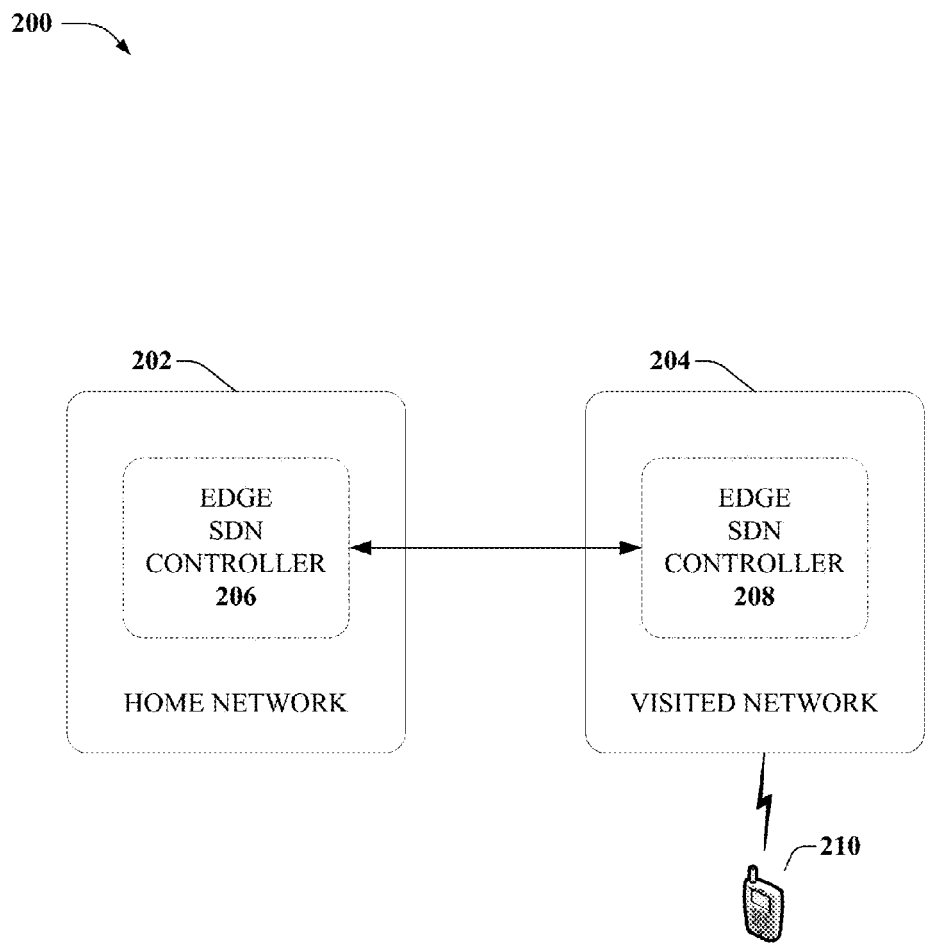
FIG. 2 is an example, non-limiting embodiment of a block diagram showing a software defined networking architecture that provides roaming support in accordance with various aspects described herein.

Turning now to FIG. 2, illustrated is an example, non-limiting embodiment of a block diagram 200 showing a software defined networking architecture that provides roaming support in accordance with various aspects described herein.

A home network 202 can be a mobility core network and can contain core network elements in the user plane and control plane that enable mobile devices on the network to transfer data to and from an external packet network. A visited network 204 can be part of another mobility core network but the visited network 204 may allow mobile devices, such as mobile device 210 to roam on the visited network.

In an embodiment, when mobile device 210 first accesses visited network 204, visited network 204 can determine which network mobile device 210 belongs to (i.e., home network 202). Visited network 204 may then send a service profile request to the home network 202 requesting service profile information such as subscription level, subscription service types, QoS levels for various applications such as voice and video, related network parameters, and service specific routing information such as lawful intercept. An edge SDN controller 206 that is specifically configured to facilitate roaming operations can intercept these service profile requests and retrieve the relevant service profile information from a policy database on home network 202. Edge SDN controller 206 can identify the relevant service profile information using mobile device identifiers in the service profile request, such as the international mobile subscriber identity ("IMSI"), or the mobile subscriber ISDN number ("MSISDN").

Once the service profile information is retrieved from the policy database, the service profile information can be transmitted by the edge SDN controller 206 to an edge SDN controller 208 on the visited network 204. The service profile information can then be used by visited network 204 in facilitating the connection of the mobile device 210 the visited network. In an embodiment, a PGW on the home network can receive data sent from the mobile device 210 to the visited network 204, and then provide the routing and data connection to an external packet network (e.g., Internet). In other embodiments, using local breakout, user plane functionality for the mobile device 210 can be provided by a PGW located at the visited network 204.

Figure 3:
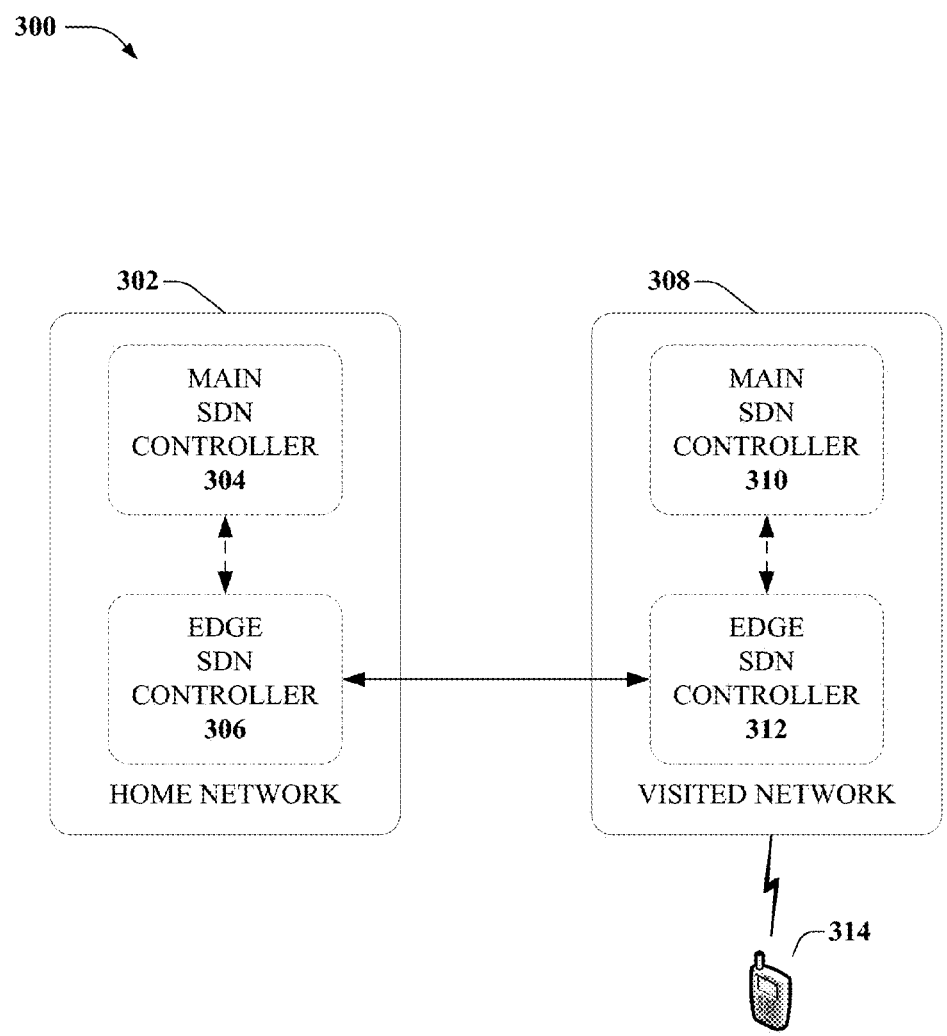
FIG. 3 is an example, non-limiting embodiment of a block diagram showing a software defined networking architecture that provides roaming support in accordance with various aspects described herein.

Turning now to FIG. 3, shown is an example, non-limiting embodiment of a block diagram 300 showing a software defined networking architecture that provides roaming support in accordance with various aspects described herein.

A home network 302 can be a mobility core network and can contain core network elements in the user plane and control plane that enable mobile devices on the network to transfer data to and from an external packet network. A visited network 308 can be part of another mobility core network but the visited network 308 may allow mobile devices, such as mobile device 314 to roam on the visited network.

In an embodiment, when mobile device 314 first accesses visited network 308, visited network 308 can determine which network mobile device 314 belongs to (i.e., home network 302). Visited network 308 may then send a service profile request to the home network 302 requesting service profile information such as subscription level, subscription service types, QoS levels for various applications such as voice and video, related network parameters, and service specific routing information such as lawful intercept. An edge SDN controller 302 that is specifically configured to facilitate roaming operations can intercept these service profile requests and forward the service profile requests to a main SDN controller 304 that can retrieve the relevant service profile information from a policy database on home network 302. Main SDN controller 304 can identify the relevant service profile information using mobile device identifiers in the service profile request, such as the international mobile subscriber identity ("IMSI"), or the mobile subscriber ISDN number ("MSISDN"). In other embodiments, the edge SDN controller can identify and retrieve the relevant service profile information directly from the policy database.

Once the service profile information is retrieved from the policy database, the service profile information can be transmitted by the edge SDN controller 306 to an edge SDN controller 312 on the visited network 308. The service profile information can then be used by main SDN controller 310 on visited network 308 in facilitating the connection of the mobile device 314 to the visited network.

Figure 4:
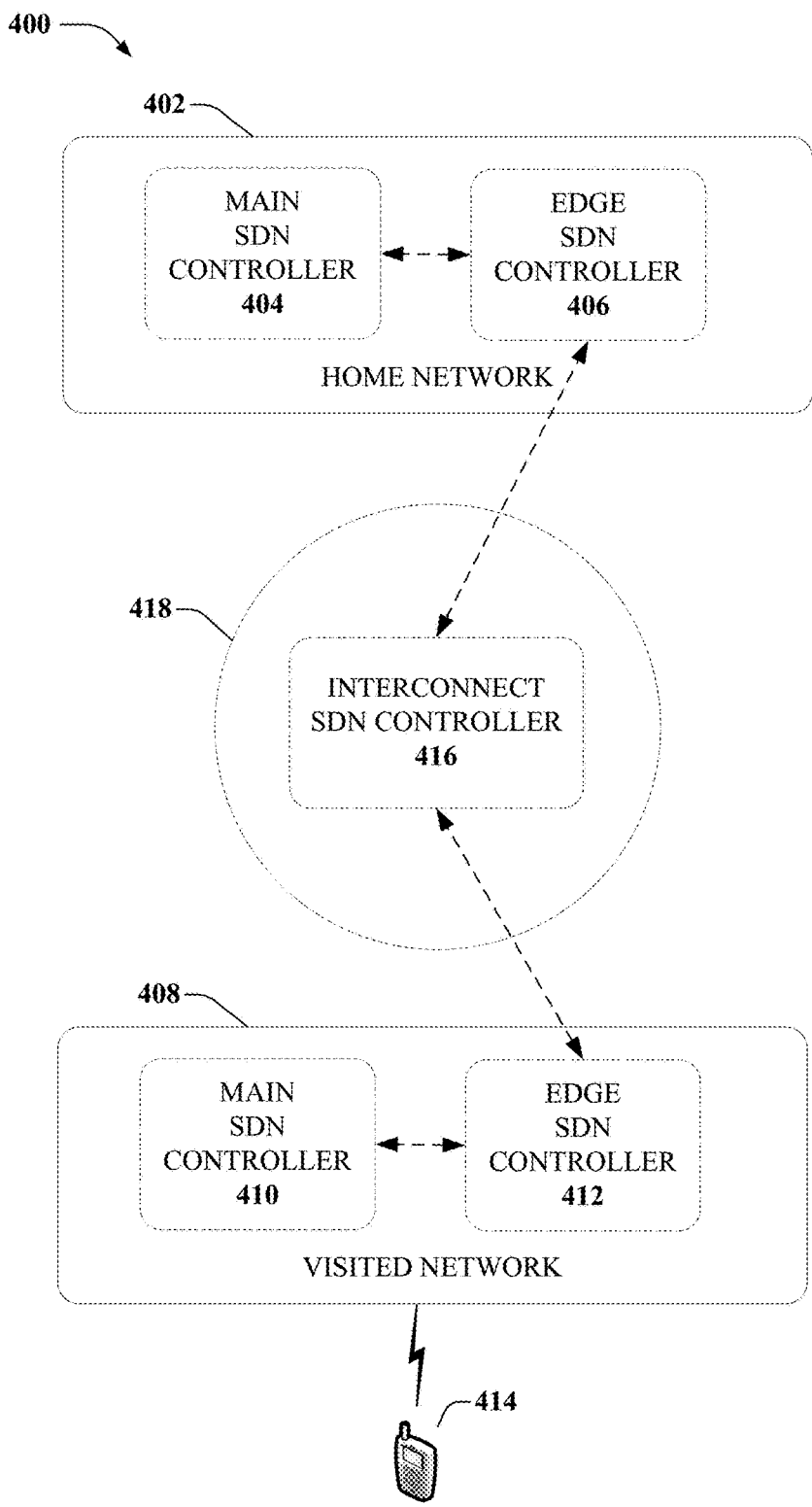
FIG. 4 is an example, non-limiting embodiment of a block diagram showing a software defined networking architecture that provides roaming support with a roaming operator in accordance with various aspects described herein.

Turning now to FIG. 4, illustrated is a example, non-limiting embodiment of a block diagram 400 showing a software defined networking architecture that provides roaming support with a roaming operator in accordance with various aspects described herein.

A home network 402 can be a mobility core network and can contain core network elements in the user plane and control plane that enable mobile devices on the network to transfer data to and from an external packet network. A visited network 408 can be part of another mobility core network but the visited network 408 may allow mobile devices, such as mobile device 414 to roam on the visited network.

In an embodiment, when mobile device 414 first accesses visited network 408 visited network 408 may then send a service profile request a roaming operator 418 that has an interconnect SDN controller 416. Interconnect SDN controller 416 can determine that home network 402 is associated with mobile device 414 and forward the service profile request to the home network 402 requesting service profile information such as subscription level, subscription service types, QoS levels for various applications such as voice and video, related network parameters, and service specific routing information such as lawful intercept. An edge SDN controller 406 that is specifically configured to facilitate roaming operations can intercept these service profile requests and forward the service profile requests to a main SDN controller 404 that can retrieve the relevant service profile information from a policy database on home network 402. Main SDN controller 404 can identify the relevant service profile information using mobile device identifiers in the service profile request, such as the international mobile subscriber identity ("IMSI"), or the mobile subscriber ISDN number ("MSISDN"). In other embodiments, the edge SDN controller can identify and retrieve the relevant service profile information directly from the policy database.

Once the service profile information is retrieved from the policy database, the service profile information can be transmitted by the edge SDN controller 406 to the interconnect SDN controller 416 at the roaming operator 418, and then interconnect SDN controller 416 can forward the service profile information to edge SDN controller 412 on the visited network 408. The service profile information can then be used by main SDN controller 410 on visited network 408 in facilitating the connection of the mobile device 414 to the visited network.

Figure 5:
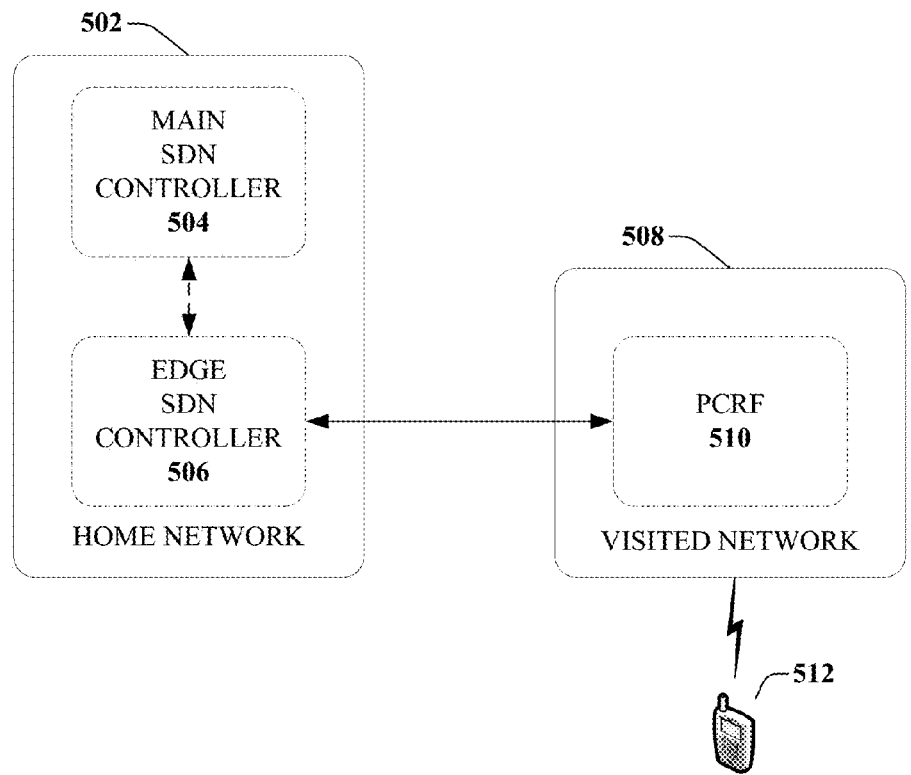
FIG. 5 is an example, non-limiting embodiment of a block diagram showing a software defined networking architecture that provides roaming support in accordance with various aspects described herein.

Turning now to FIG. 5, illustrated is a block diagram showing a software defined networking architecture that provides roaming support in accordance with various aspects described herein.

A home network 502 can be a mobility core network and can contain core network elements in the user plane and control plane that enable mobile devices on the network to transfer data to and from an external packet network. A visited network 508 can be part of another mobility core network but the visited network 508 may allow mobile devices, such as mobile device 512 to roam on the visited network.

In an embodiment, when mobile device 512 first accesses visited network 508, visited network 508 can determine which network mobile device 512 belongs to (i.e., home network 502). Visited network 508 may then send a service profile request to the home network 502 requesting service profile information such as subscription level, subscription service types, QoS levels for various applications such as voice and video, related network parameters, and service specific routing information such as lawful intercept.

In an embodiment, a legacy PCRF 510 on visited network 508 can send the service profile request in a non-SDN compatible protocol. The edge SDN controller 506 can translate the service profile request into a SDN compatible protocol and forward the request to the MAIN SDN controller 504 or execute the request at the edge SDN controller 506. Once the service profile information is retrieved, edge SDN controller 506 can transmit the service profile information back to the PCRF 510 in a protocol compatible with the PCRF 510.

Figure 6:
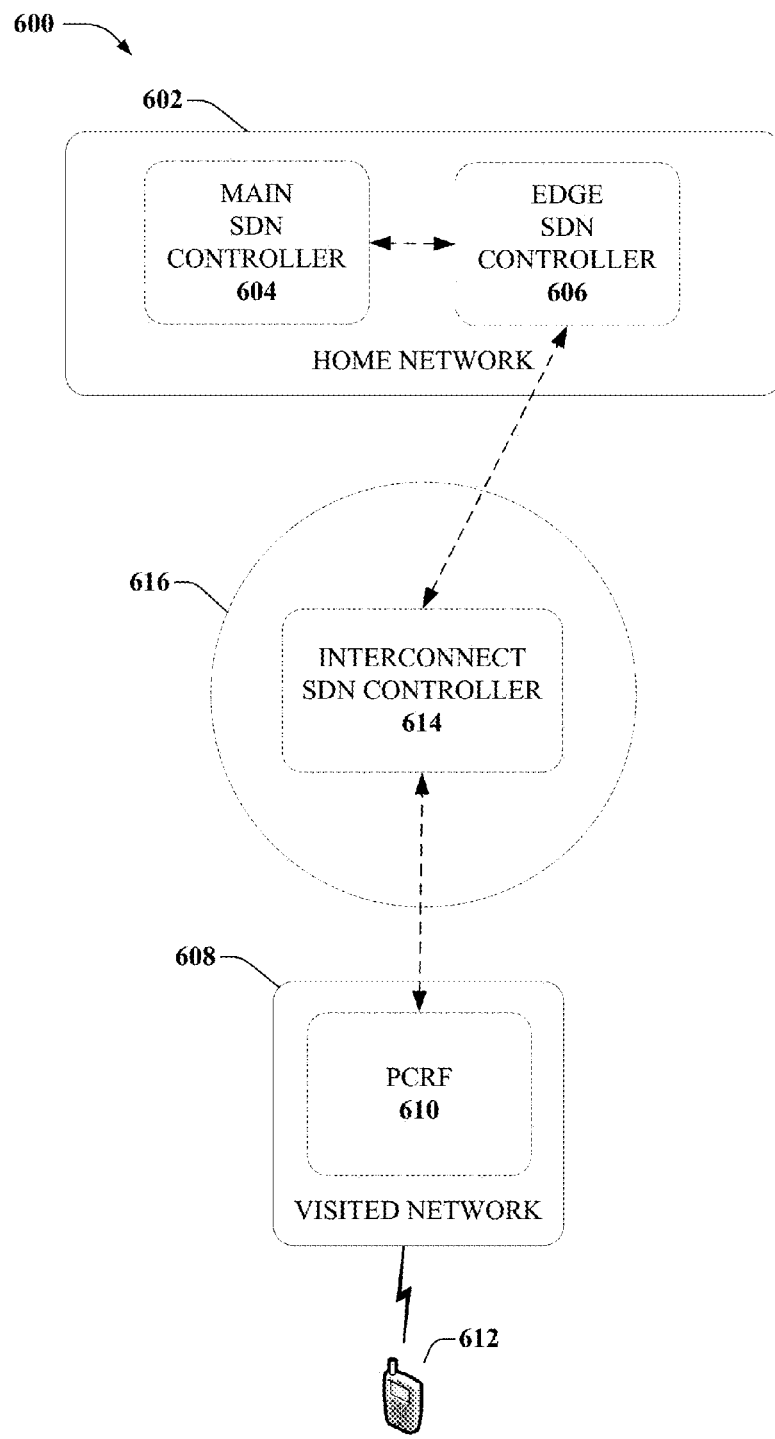
FIG. 6 is an example, non-limiting embodiment of a block diagram showing a software defined networking architecture that provides roaming support with a roaming operator in accordance with various aspects described herein.

Turning now to FIG. 6, illustrated is a block diagram 600 showing a software defined networking architecture that provides roaming support with a roaming operator in accordance with various aspects described herein.

A home network 602 can be a mobility core network and can contain core network elements in the user plane and control plane that enable mobile devices on the network to transfer data to and from an external packet network. A visited network 608 can be part of another mobility core network but the visited network 608 may allow mobile devices, such as mobile device 612 to roam on the visited network.

In an embodiment, when mobile device 612 first accesses visited network 608 visited network 608 may then send a service profile request a roaming operator 616 that has an interconnect SDN controller 614. The service profile request can be sent by a legacy PCRF 610 on visited network 608 using a non-SDN compatible protocol. Interconnect SDN controller can translate the request to a SDN compatible protocol, and then forward the service profile request to the home network 602 requesting service profile information. An edge SDN controller 606 that is specifically configured to facilitate roaming operations can intercept these service profile requests and forward the service profile requests to a main SDN controller 604 that can retrieve the relevant service profile information from a policy database on home network 602. Main SDN controller 604 can identify the relevant service profile information using mobile device identifiers in the service profile request, such as the international mobile subscriber identity ("IMSI"), or the mobile subscriber ISDN number ("MSISDN"). In other embodiments, the edge SDN controller can identify and retrieve the relevant service profile information directly from the policy database.

Once the service profile information is retrieved from the policy database, the service profile information can be transmitted by the edge SDN controller 606 to the interconnect SDN controller 614 at the roaming operator 616, and then interconnect SDN controller 614 can forward the service profile information to PCRF 610 after translating it back to the PCRF 610 compatible protocol. The service profile information can then be used by PCRF 610 on visited network 608 in facilitating the connection of the mobile device 612 to the visited network.

Figure 7:
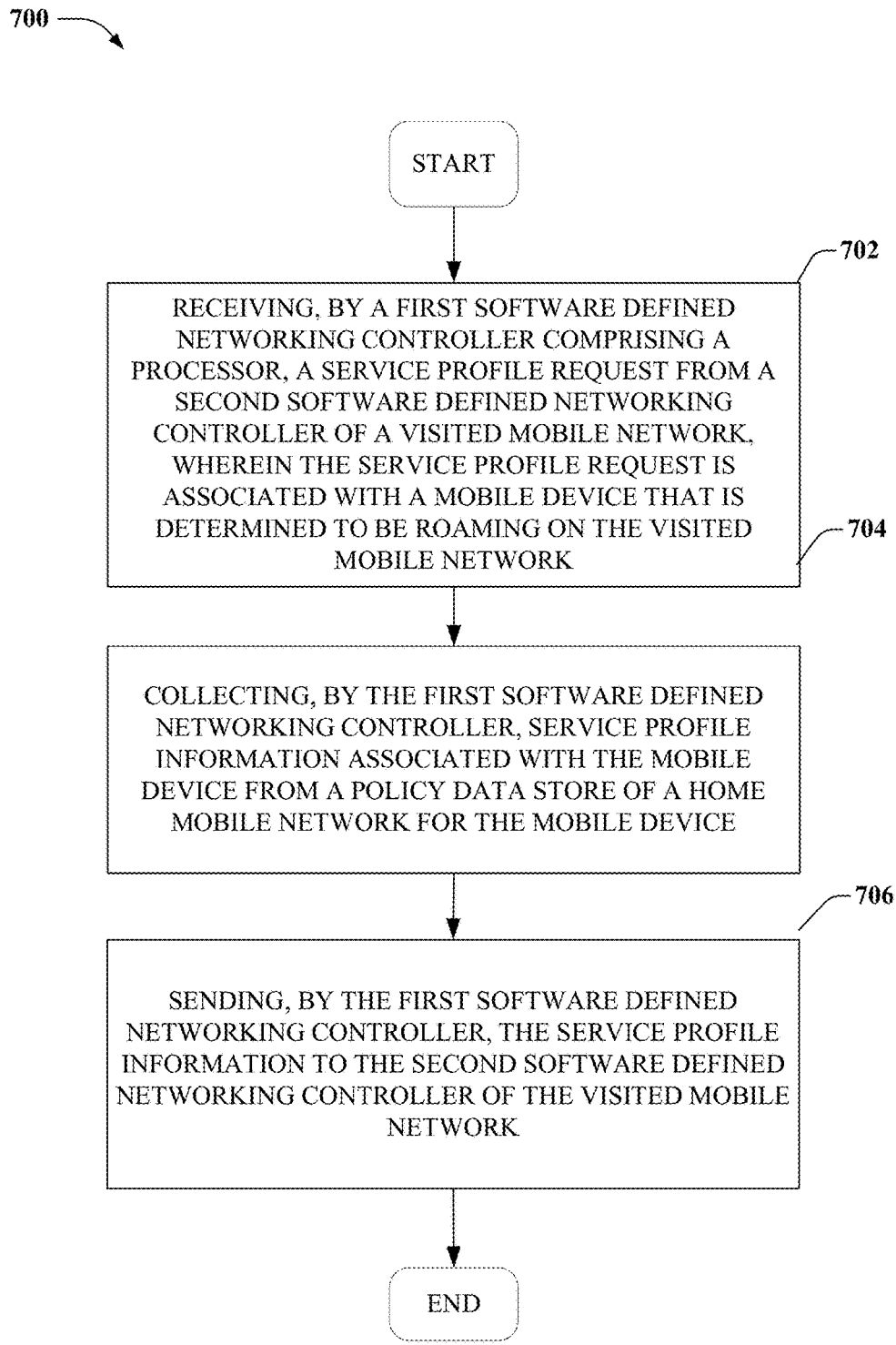
FIG. 7 is an example, non-limiting embodiment of a method for facilitating roaming services using software defined networking in accordance with various aspects described herein.
Figure 8:
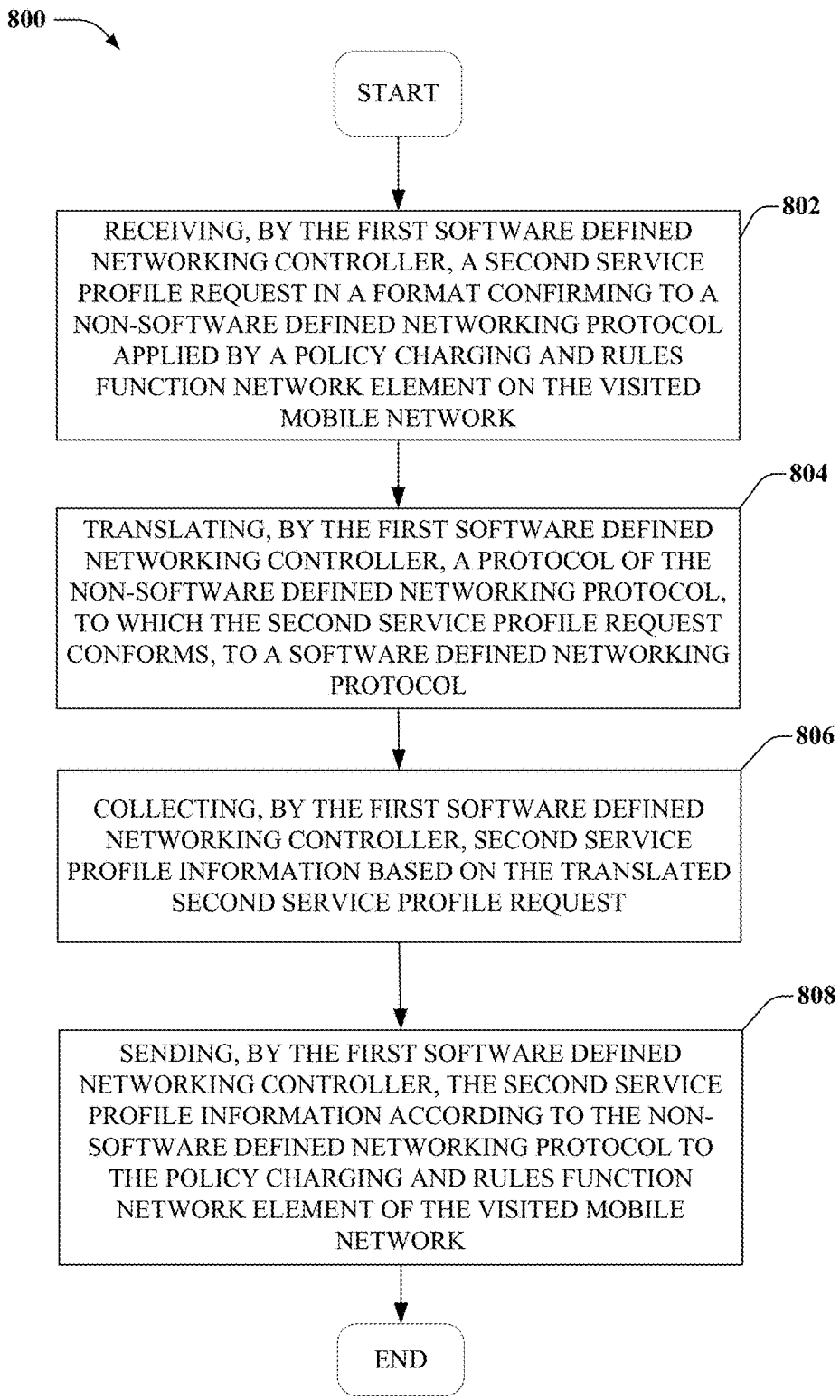
FIG. 8 is an example, non-limiting embodiment of a method for facilitating roaming services using software defined networking in accordance with various aspects described herein.

FIGS. 7-8 illustrate a process in connection with the aforementioned systems. The processes in FIGS. 7-8 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method 700 for performing traffic control management. At 702, the method comprises receiving, by a first software defined networking controller comprising a processor, a service profile request from a second software defined networking controller of a visited mobile network, wherein the service profile request is associated with a mobile device that is determined to be roaming on the visited mobile network. At 704 the method includes collecting, by the first software defined networking controller, service profile information associated with the mobile device from a policy data store of a home mobile network for the mobile device.

At 706, the method can include sending, by the first software defined networking controller, the service profile information to the second software defined networking controller of the visited mobile network.

FIG. 8 illustrates a flow diagram of an example, non-limiting embodiment of a method 800 for performing traffic control management. At 802, the method comprises receiving, by the first software defined networking controller, a second service profile request in a format confirming to a non-software defined networking protocol applied by a policy charging and rules function network element on the visited mobile network. At 804, the method comprises translating, by the first software defined networking controller, a protocol of the non-software defined networking protocol, to which the second service profile request conforms, to a software defined networking protocol.

At 806, the method can comprise collecting, by the first software defined networking controller, second service profile information based on the translated second service profile request. At 808, the method can include sending, by the first software defined networking controller, the second service profile information according to the non-software defined networking protocol to the policy charging and rules function network element of the visited mobile network.

Figure 9:
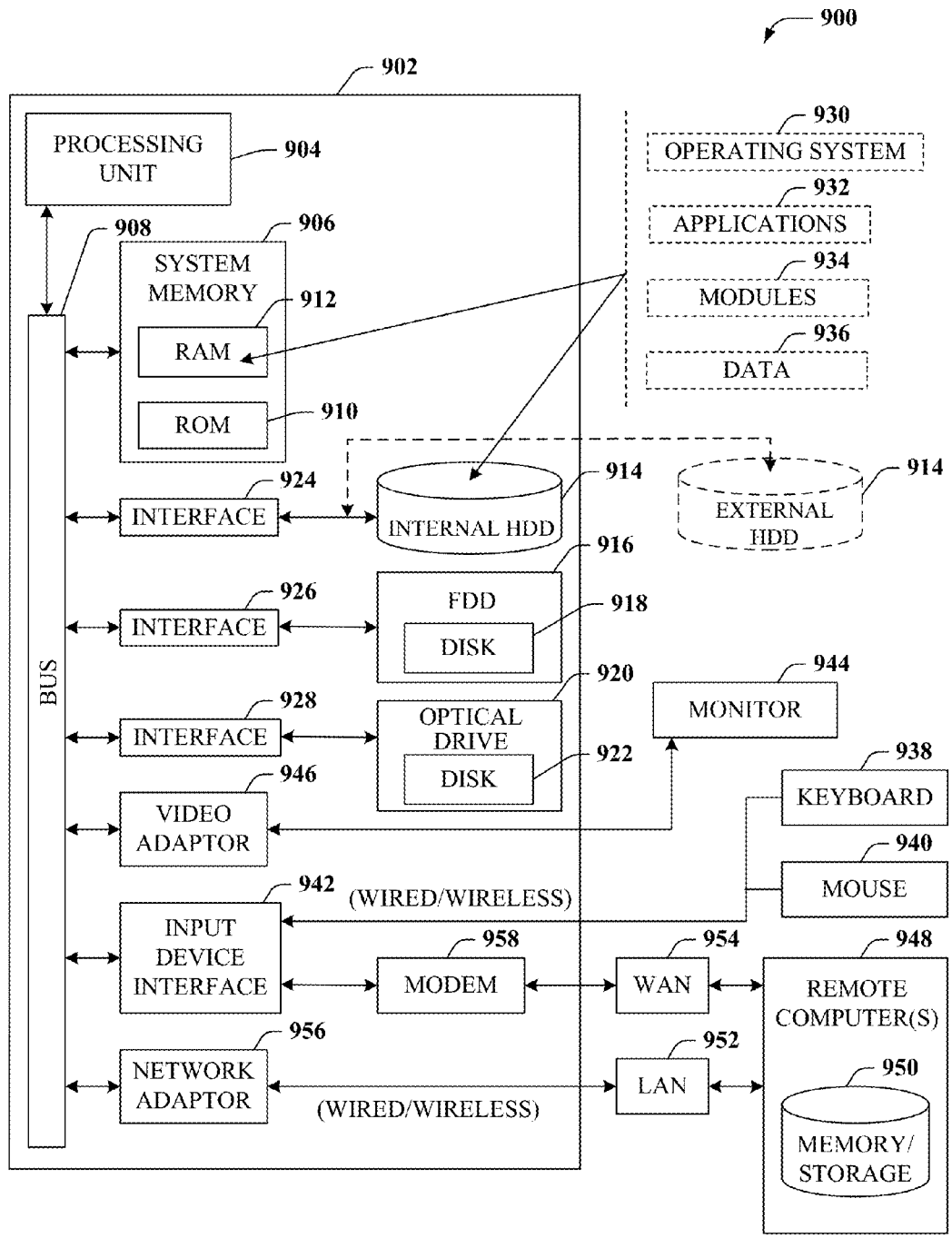
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 902 can provide the environment and/or setting in which one or more of the core mobility networks disclosed in FIGS. 1-6 can be operated from. For instance, the edge SDN controllers disclosed herein can be applications 932 stored in hard drive 914 and executed by processing unit 904.

Figure 10:
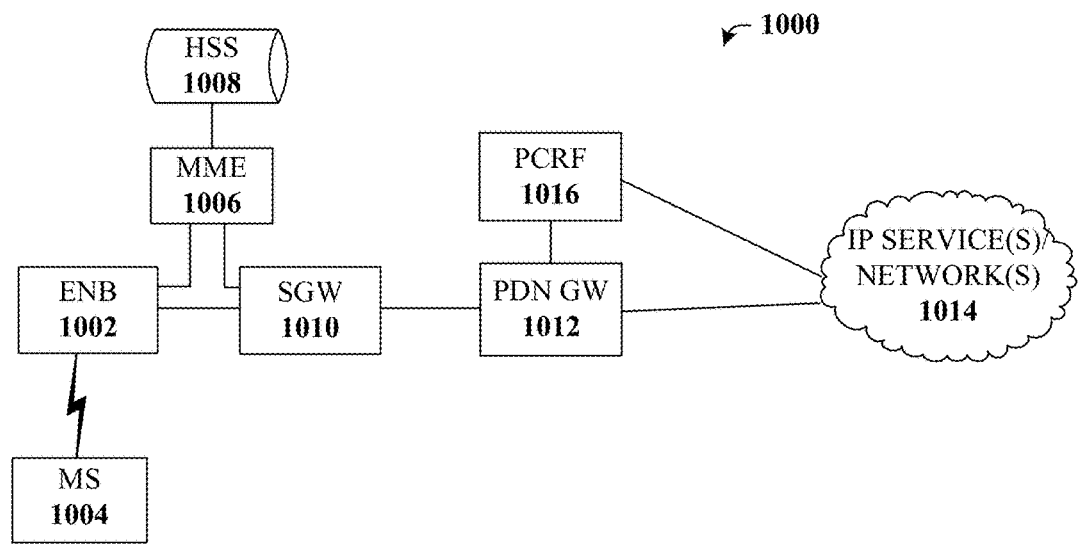
FIG. 10 illustrates a Long Term Evolution (LTE) network architecture that can employ the disclosed architecture

FIG. 10 illustrates a high-level block diagram that depicts an example LTE network architecture 1000 that can employ the disclosed communication architecture. The evolved RAN for LTE consists of an eNodeB (eNB) 1002 that can facilitate connection of MS 1004 to an evolved packet core (EPC) network. In one aspect, the MS 1004 is physical equipment or Mobile Equipment (ME), such as a mobile phone or a laptop computer that is used by mobile subscribers, with a Subscriber identity Module (SIM). The SIM is associated with a CTN, an International Mobile Subscriber Identity (IMSI), IMEI, and/or MSISDN, which is a unique identifier of a subscriber. The MS 1004 includes an embedded client that receives and processes messages received by the MS 1004. As an example, the embedded client can be implemented in JAVA. It is noted that MS 1004 can be substantially similar mobile devices 412 and 414 or 512 and 514.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber.

As an example, the eNB 1002 can host a PHYsical (PHY), Medium Access Control (MAC), Radio Link Control (RLC), and Packet Data Control Protocol (PDCP) layers that include the functionality of user-plane header-compression and encryption. In addition, the eNB 1002 can implement at least in part Radio Resource Control (RRC) functionality (e.g., radio resource management, admission control, scheduling, cell information broadcast, etc.). The eNB 1002 can be coupled to a serving gateway (SGW) 1010 that facilitates routing of user data packets and serves as a local mobility anchor for data bearers when the MS 1004 moves between eNBs. In addition, the SGW 1010 can act as an anchor for mobility between LTE and other 3GPP technologies (GPRS, UMTS, etc.). When MS 1004 is in an idle state, the SGW 1010 terminates a downlink (DL) data path and triggers paging when DL data arrives for the MS 1004. Further, the SGW 1010 can perform various administrative functions in the visited network such as collecting information for charging and lawful interception.

In one aspect, the SGW 1010 can be coupled to a Packet Data Network Gateway (PDN GW) 1012 that provides connectivity between the MS 1004 and external packet data networks such as IP service(s)/network(s) 1014. Moreover, the PDN GW 1012 is a point of exit and entry of traffic for the MS 1004. It is noted that the MS 1004 can have simultaneous connectivity with more than one PDN GW (not shown) for accessing multiple PDNs.

The PDN GW 1012 performs IP address allocation for the MS 1004, as well as QoS enforcement and implements flow-based charging according to rules from a Policy Control and Charging Rules Function (PCRF) 1016. The PCRF 1016 can facilitate policy control decision-making and control flow-based charging functionalities in a Policy Control Enforcement Function (PCEF), which resides in the PDN GW 1012. The PCRF 1016 can store data (e.g., QoS class identifier and/or bit rates) that facilitates QoS authorization of data flows within the PCEF. In one aspect, the PDN GW 1012 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO). Although a LTE network architecture 1000 is described and illustrated herein, it is noted that most any communication network architecture can be utilized to implement the disclosed embodiments.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A first software defined networking controller, comprising:
   a processor; and
   a memory that stores executable instructions that, when executed by the processor, facilitate performance of operations, comprising:
      receiving a service profile request from a policy and rules charging function network element of a visited mobile network, wherein the service profile request is associated with a mobile device that is roaming on the visited mobile network, and wherein a first protocol associated with the policy and rules charging function network element is different from a second protocol associated with a second software defined networking controller of a home mobile network;
      translating the first protocol based on the second protocol resulting in an updated service profile request;
      forwarding the updated service profile request to the second software defined networking controller of the home mobile network;
      retrieving service profile data representative of a service profile of the mobile device from the second software defined networking controller that received the service profile data from a policy data store of the home mobile network of the mobile device; and
      initiating transmission of the service profile data about the mobile device to the policy and rules charging function network element.

2. The first software defined networking controller of claim 1, wherein the receiving the service profile request comprises receiving the service profile request via an interconnect software defined networking controller associated with a roaming operator identity distinct from the home mobile network and the visited mobile network.

3. The first software defined networking controller of claim 1, wherein a third software defined networking controller is a sub-controller of the second software defined networking controller associated with the home mobile network, and wherein the second software defined networking controller is located at an edge of the home mobile network.

4. The first software defined networking controller of claim 1, wherein the operations further comprise:

facilitating routing data from the mobile device on the visited mobile network to a packet data gateway network device on the visited mobile network.

5. The first software defined networking controller of claim 1, wherein the operations further comprise:
receiving a second service profile request from the policy charging and rules function network element of the visited mobile network, wherein the second service profile request adheres to a non-software defined networking compatible protocol; and
translating the second service profile request to a software defined networking compatible protocol resulting in a translated second service profile request.

6. The first software defined networking controller of claim 5, wherein the service profile data is first service profile data, and wherein the operations further comprise:
retrieving second service profile data based on the translated second service profile request; and
transmitting the second service profile data to the policy charging and rules function network element of the visited mobile network.

7. The first software defined networking controller of claim 1, wherein the service profile data is first service profile data, and wherein the operations further comprise:
determining second service profile data based on a mobile device identifier associated with the service profile request.

8. The first software defined networking controller of claim 1, wherein the service profile data comprises subscription data associated with the mobile device, quality of service data associated with the mobile device, and routing data associated with the mobile device.

9. A method, comprising:
receiving, by a first software defined networking controller comprising a processor, a service profile request from a policy and rules charging function network element of a visited mobile network, wherein the service profile request is associated with a mobile device that is determined to be roaming on the visited mobile network and wherein a first protocol of the policy and rules charging function network element is different from a second protocol of a second software defined networking controller of a home mobile network;
in response to the receiving, translating the first protocol to conform to the second protocol, resulting in an updated service profile request;
forwarding the updated service profile request to the second software defined networking controller of the home mobile network;
collecting, by the first software defined networking controller, service profile data representative of a service profile associated with the mobile device from the second software defined networking controller which received the service profile data from a policy data store of the home mobile network; and
sending, by the first software defined networking controller, the service profile data to the policy and rules charging function network element of the visited mobile network.

10. The method of claim 9, further comprising:
receiving, by the first software defined networking controller, the service profile request from a network device, of a roaming operator identity, that has an interconnect software defined networking controller.

11. The method of claim 9, further comprising:
initiating, by the first software defined networking controller, transfer of the service profile request to a third software defined controller associated with the home mobile network.

12. The method of claim 9, further comprising:
routing, by the first software defined networking controller, data from the mobile device that is roaming on the visited mobile network to a packet data gateway network device of the visited mobile network.

13. The method of claim 9, wherein the service profile request is a first service profile request, and further comprising:
receiving, by the first software defined networking controller, a second service profile request in a format conforming to a non-software defined networking protocol applied by the policy charging and rules function network element on the visited mobile network; and
translating, by the first software defined networking controller, a protocol of the non-software defined networking protocol, to which the second service profile request conforms, to a software defined networking protocol.

14. The method of claim 13, further comprising:
collecting, by the first software defined networking controller, second service profile data based on the translated second service profile request; and
sending, by the first software defined networking controller, the second service profile data according to the non-software defined networking protocol to the policy charging and rules function network element of the visited mobile network.

15. The method of claim 9, further comprising:
based on a mobile device identifier associated with the service profile request, determining, by the first software defined networking controller, service profile data associated with the mobile device.

16. A non-transitory machine-readable storage medium, comprising executable instructions that, when executed by a processor, facilitate performance of operations, comprising:
receiving a service profile request of a mobile device from a policy and rules charging function network element of a roaming network on which the mobile device is roaming, wherein a first protocol is associated with the policy and rules charging function network element;
translating the first protocol to map to a second protocol associated with a second software defined networking controller of a home mobile network, resulting in an updated service profile request;
forwarding the updated service profile request to the second software defined networking controller;
in response to the forwarding, collecting service profile data representative of a service profile of the mobile device from the second software defined networking controller that received the service profile data from a policy data store of the home network; and
sending the service profile data about the mobile device to the policy and rules charging function network element of the roaming network.

17. The non-transitory machine-readable storage medium of claim 16, wherein the operations further comprise:
receiving the service profile request from a network device associated with a roaming operator identity of the roaming network that has an interconnect software defined networking controller.

18. The non-transitory machine-readable storage medium of claim 16, wherein the operations further comprise:

facilitating routing data from the mobile device on the roaming network to a packet data gateway network device of the visited network.

19. The non-transitory machine-readable storage medium of claim 16, wherein the second software defined networking controller is a sub-controller of a third software defined networking controller associated with the home network.

20. The non-transitory machine-readable storage medium of claim 16, wherein the operations further comprise:
based on a mobile device identifier associated with the service profile request, determining service profile data associated with the mobile device.

* * * * *